United States Patent
Brown et al.

(10) Patent No.: US 8,108,975 B2
(45) Date of Patent: Feb. 7, 2012

(54) KARABINER

(75) Inventors: Kevin Brown, Cheshire (GB); Mark Carnall, Bristol (GB)

(73) Assignee: Wild Country Limited, Derbyshire (GB)

( * ) Notice: Subject to any disclaimer, the term of this patent is extended or adjusted under 35 U.S.C. 154(b) by 719 days.

(21) Appl. No.: 12/190,341

(22) Filed: Aug. 12, 2008

(65) Prior Publication Data

US 2009/0178250 A1    Jul. 16, 2009

Related U.S. Application Data

(63) Continuation of application No. 11/111,470, filed on Apr. 21, 2005, now abandoned, which is a continuation-in-part of application No. 09/922,496, filed on Aug. 3, 2001, now abandoned.

(30) Foreign Application Priority Data

Aug. 4, 2000 (GB) .................................... 0019136

(51) Int. Cl.
     *F16B 45/00*      (2006.01)
(52) U.S. Cl. ..................................... 24/598.2; 24/601.1
(58) Field of Classification Search ................. 24/598.2, 24/598.7, 599.5, 599.9–600.2, 601.1, 601.3
See application file for complete search history.

(56) References Cited

U.S. PATENT DOCUMENTS

| | | | |
|---|---|---|---|
| 229,137 A | 6/1880 | Jenkins | |
| 731,162 A | 6/1903 | Carter | |
| 1,388,494 A | 8/1921 | Vale | |
| 1,849,816 A | 3/1932 | Yingling | |
| 3,064,384 A | 11/1962 | Lewis et al. | |
| 3,827,746 A | 8/1974 | Byers | |
| 4,528,728 A | 7/1985 | Schmidt et al. | |
| 4,802,264 A | 2/1989 | Isenhart | |
| 5,018,295 A | 5/1991 | Taylor, IV et al. | |
| 5,287,645 A | 2/1994 | Gois | |
| 5,384,943 A | 1/1995 | LeFebvre et al. | |
| 5,463,798 A | 11/1995 | Wurzer | |
| 5,505,013 A | 4/1996 | Gois | |
| 5,608,953 A | 3/1997 | Petzl et al. | |
| 5,655,327 A | 8/1997 | Wardell, Jr. | |

(Continued)

FOREIGN PATENT DOCUMENTS

DE      3126066      1/1983

(Continued)

OTHER PUBLICATIONS

Black Diamond Equipment 1996 Spring Sales Catalog, pp. 6-7, description of Livewire and Hotwire carabiner. This document was published and distributed by Black Diamond Equipment, Ltd., 2084 East 3900 South, Salt Lake City, UT 84124 USA, www.blackdiamondequipment.com.

*Primary Examiner* — James Brittain
(74) *Attorney, Agent, or Firm* — The Webb Law Firm (57) ABSTRACT

A karabiner including a generally C-shaped body having opposed free ends with a gap therebetween and a gate for closing the gap through constraint. The gate is formed of a wire member located on one free end of the body and includes a shaped free end. The other free end of the body is configured to receive the shaped free end of the gate, and includes a shape that corresponds substantially with the shape of the shaped end of the gate. In one embodiment, the loop is oriented substantially transversely to the plane of the karabiner body, and in another embodiment, the second free end of the body includes a recessed seat. A locking means on the gate or karabiner body is also disclosed.

23 Claims, 8 Drawing Sheets

U.S. PATENT DOCUMENTS

| | | |
|---|---|---|
| 5,791,025 A | 8/1998 | Maurice et al. |
| 5,864,929 A | 2/1999 | Sakong |
| 5,878,834 A | 3/1999 | Brainerd et al. |
| 5,913,479 A | 6/1999 | Westwood, III |
| 5,918,701 A | 7/1999 | Rogelja |
| 5,937,490 A | 8/1999 | Mihailovic |
| 5,940,943 A | 8/1999 | Kloster |
| 6,161,264 A | 12/2000 | Choate |
| 6,223,372 B1 | 5/2001 | Barber |
| 6,622,354 B1 | 9/2003 | Klingier |
| 2002/0073520 A1 | 6/2002 | Hall |

FOREIGN PATENT DOCUMENTS

| | | |
|---|---|---|
| DE | 296 10 293 U1 | 6/1996 |
| DE | 195 39 587 A1 | 4/1997 |
| DE | 197 32 204 A1 | 2/1999 |
| EP | 0 318 742 A1 | 6/1989 |
| EP | 1 070 862 A1 | 1/2001 |
| EP | 1 178227 A1 | 2/2002 |
| EP | 1 384 497 A1 | 1/2004 |
| FR | 2 766 884 | 2/1999 |
| GB | 599471 | 3/1948 |
| GB | 2 077 838 A | 12/1981 |
| GB | 2 340 173 A | 2/2000 |
| GB | 2 365 486 A | 2/2002 |
| GB | 2 391 902 A | 2/2004 |
| GB | 2 400 628 A | 10/2004 |
| WO | WO 93/25822 | 12/1993 |
| WO | WO 98/11798 | 3/1998 |

KARABINER

CROSS REFERENCE TO RELATED APPLICATIONS

This application is a continuation of U.S. patent application Ser. No. 11/111,470, filed Apr. 21, 2005, which is a continuation-in-part of U.S. patent application Ser. No. 09/922,496, filed Aug. 3, 2001, which claims priority to United Kingdom Patent No. UK 0019136.1, filed Aug. 4, 2000, which are incorporated herein by reference in their entirety.

BACKGROUND OF THE INVENTION

1. Field of the Invention

This invention concerns snap hooks, also known as karabiners, for use in climbing and other activities requiring connections to be made to ropes, cables and carrying loops for equipment.

2. Description of Related Art

Karabiners generally comprise a C-shaped body with its ends curved towards each other and forming a gap closed by a spring loaded gate pivotally mounted on one body end and urged into engagement with the other body end. A thimble or other locking member may be provided either on the gate or the free body end and which is movable, say slidably or along screw threading, to lock the gate in a closed position.

When unlocked, the gate of a karabiner is urged closed and a rope or loop can be snapped into the karabiner by pushing it against the gate to open it. Once the rope or loop is in the confines of the C-shaped body, the gate can spring back to its closed position, where it can be locked, if desired.

SUMMARY OF THE INVENTION

There are a number of problems associated with currently available karabiners, such as, the number of components required particularly in providing a spring-loaded gate and in the gate or body having a hooked end on which ropes or other items can snag.

An object of this invention is to provide an improved karabiner. In a preferred and non-limiting embodiment, there is provided a karabiner comprising a generally C-shaped body, with its free ends curved towards each other and forming a gap therebetween, and a gate for closing the gap, the gate being formed of a wire member shaped and located on one free end of the body, such that it is constrained to close the gap and the other end of the gate having a slot for receiving a shaped end of the gate.

In one preferred and non-limiting embodiment, the gate is preferably formed by a wire that is bent double and has each free end further bent inwards toward each other to locate in a different hole on opposite sides of the free end of the body, one hole being above the other. From its locations in the free end of the body, the two strands of the wire are bent toward each other to approximately a mid-point of the gate until they overlap in a plane of the body. At its free end the gate may be shaped by folding or bending of the wire to form a shaped end. For example, the end of the gate may be bent over sideways or the loop at the end of the gate enlarged. An alternative may be to use the loop formed where the wire is bent double to capture a shaped nut that can locate in the slot of the free end of the body. Yet again, the nut may be shaped to be slid onto the gate.

The slot preferably has, from the free end of the body, a first narrow part to accommodate the shaped end of the gate. Between the wide and narrow parts of the slot a ledge may be provided. The ledge is preferably in a plane substantially normal to a longitudinal axis of the gate. Thus, when forces are applied to opposite ends of the karabiner, the ends of the body will tend to bend inward even only to a slight extent which will cause the ledge to be angled upwardly relative to the gate and thus help to retain the shaped end of the gate in the slot of the free end of the body.

The gate or the free end of the body may carry additional locking means for when the gate is closed. In one preferred embodiment, a thimble may be provided on the gate that can be moved up the gate to overlap at least partially the free end of the body. Conveniently, an outward positioned screw threaded sleeve may be provided on the gate and an internally positioned screw threaded thimble may be provided on the sleeve.

In another preferred and non-limiting embodiment, a locking ring may be mounted rotatably on the free end of the body, the ring having a slot therein, whereby in one position the gate can pass through the slot of the ring for its shaped end to locate in the slot of the free end of the body and then by rotating the ring, the slot therein is no longer accessible to the gate.

In yet another preferred and non-limiting embodiment, the gate may be provided with a slidable locking member that, for example, can be slid upwards when the gate is closed, the locking member having a finger or the like that extends over the opposite side of the body to that of the slot opening to prevent the gate from being pushed open.

Another preferred embodiment provides a locking pin that can be inserted through the free end of the body of the karabiner and into or through the end of the gate to prevent it from being pushed open. The locking pin can be on a flexible or spring-biased tab attached to the gate. Alternatively, the pin can be rotatably mounted in the slot of the free end of the body between a first position wherein a lip on the end of the pin can pass through a loop of the wire gate and a second position wherein the lip retains the loop of the gate in the slot. The slot of the free end of the body preferably faces inwards (i.e., towards the body of the karabiner). In some embodiments, however, the slot may be on the side of the free end of the body. In yet other embodiments, the slot may be shaped with a part that interengages with the wire gate, especially through a loop thereof.

According to a second embodiment of this invention there is provided a karabiner comprising a generally C-shaped body with its free ends curved toward each other and forming a gap therebetween and a spring-biased gate for closing the gap located on one free end of the body and the other free end having a wire cage thereon for receiving the gate. The gate of the second embodiment of the invention may be a conventional karabiner gate, such as of metal bar or the like.

According to a third embodiment of this invention, there is provided a karabiner comprising a generally C-shaped body with its free ends curved towards each other and forming a gap therebetween and a spring-biased gate for closing the gap located on one free end of the body and means for locking the gate in a closed position. In this embodiment, the gate may be a conventional karabiner gate, such as of metal bar or the like. The locking means may be a slidable locking member that, for example, can be slid upwards on the gate and that has a finger or the like to extend over the opposite side of the body to that of the direction of opening on the gate. Alternatively, a locking pin is provided on a flexible or spring-biased tab attached to the gate, which pin can be inserted through a hole in the free end of the karabiner body and into a hole or slot of the gate when closed.

According to a fourth embodiment of the present invention, the karabiner includes a generally C-shaped body having opposed free ends with a gap therebetween and a gate for closing the gap, such that it is constrained to close the gap. The gate is formed with a wire member located on one free end of the body, and the gate is in the form of a loop having a shaped free end. The other free end of the body has a recessed seat for sealing the shaped free end of the gate. It is this other free end of the body having the recessed seat that is shaped to correspond substantially with the shaped end of the gate. In one preferred and non-limiting embodiment, the recessed seat is in a substantially horseshoe shape. The recessed seat may also be partially bounded by one or more walls, such that when the gate is in a closed position, and the shaped free end of the loop is contacting the recessed seat, the wall or walls protect an end portion of the shaped free end of the loop from contact. For example, the wall or walls would protect the end portion of the shaped free end of the loop from rope contact, line contact, impact, sideward impact, outward object impact, etc.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Referring to FIGS. 1-36, a karabiner 10 comprises a generally C-shaped body 12 having its free ends 14, 16 generally facing each other but leaving a gap 18 therebetween. Pivotally mounted on one free end 14 of the body 12 is a gate 20. The body 12 of the karabiner 10 is shaped, where it curves, to provide locations for ropes or the like. As shown in FIGS. 1-17, at its top is a slight recess 21 and at the bottom a portion curved upwards at a more acute angle than at the top to provide a relatively confined location for a rope or the like.

In one preferred and non-limiting embodiment, the gate 20 is formed of wire bent substantially and doubly over. The wire is bent such that it forms two strands 22, 24 with a loop 26 between them. The two strands 22, 24 overlie each other for a first part from the loop 26, so that in the karabiner they are in the plane of the body 12. From the end of the first part, the two strands diverge to opposite sides of the body 12 before bending inwards to form ends 28, 30 that each locate in separate holes 32, 34 one above the other in the free end 14 of the karabiner body 12. From the end of the first part, the two strands 22, 24 diverge to opposite sides of the body 12 before bending inwards to form ends 28, 30 that each locate in separate holes 32, 34 one above the other in the free end 14 of the karabiner body 12. The shaping of the gate 20 and the offsetting of its pivot points urge the gate 20 to a closed position as shown in FIGS. 1-6 of the drawings. Once pressure is applied to the gate 20 inwardly, it will open but always spring back to a closed position when the pressure is removed. Thus, a rope or the like can be pushed in the karabiner 10 through the gate 20 which then snaps back to close the karabiner 10 and retain the rope or the like therein.

The free end of the gate 20 has located in the loop 26, a nut 36 and the free end 16 of the karabiner body 12 has a shaped slot 38, which receives the nut 36 when the gate 20 is closed. The slot 38 is shown in more detail in FIGS. 13-17. The slot 38 has a first narrow part 40 open to the end of the free end 16 of the body 12 and leading to a wide part 42 forming ledges 44 on opposite sides of the slot. The ledges 44 are generally normal to a longitudinal axis of the gate 20 to the extent that the ledges 44 slope upwardly in the direction of the gate 20 opening thus rendering it more difficult to be opened inadvertently in a load situation. This is an important safety feature of the illustrated embodiment of the karabiner 10 of the present invention. Furthermore, as can be seen, the free end 16 of the karabiner 10 has a generally smooth profile, which advantageously can avoid the risk of snagging ropes, etc. thereon.

FIGS. 18-31 show variations on the basic karabiner 10 of FIGS. 1-17 and only the differences will be described in detail hereinafter. Like parts have been given the same reference numbers throughout for ease in understanding.

Figures 1, 2, 3, 4, 6:
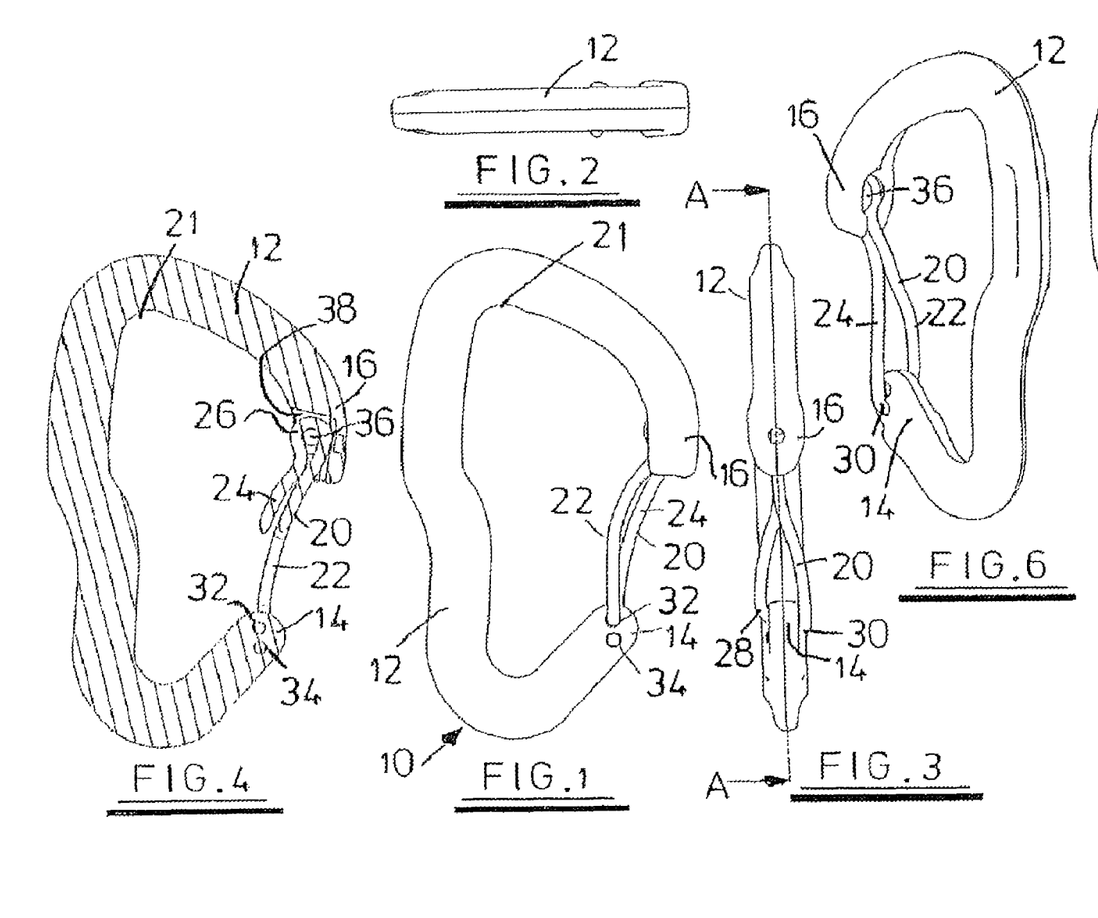
FIG. 1 is a side view of a karabiner according to the present invention in a closed position.
FIG. 2 is a top plan view of the karabiner of FIG. 1.
FIG. 3 is a front view of the karabiner of FIG. 1.
FIG. 4 is a side sectional view on line A-A of the karabiner of FIG. 3.
FIG. 6 is a perspective view from the rear and opposite sides of the karabiner of FIG. 1.
Figure 5:
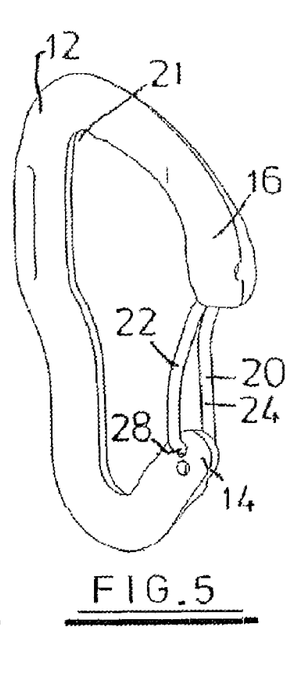
FIG. 5 is a perspective view from one side and the front of the karabiner of FIG. 1.
Figures 7, 8, 9, 10, 11, 12:
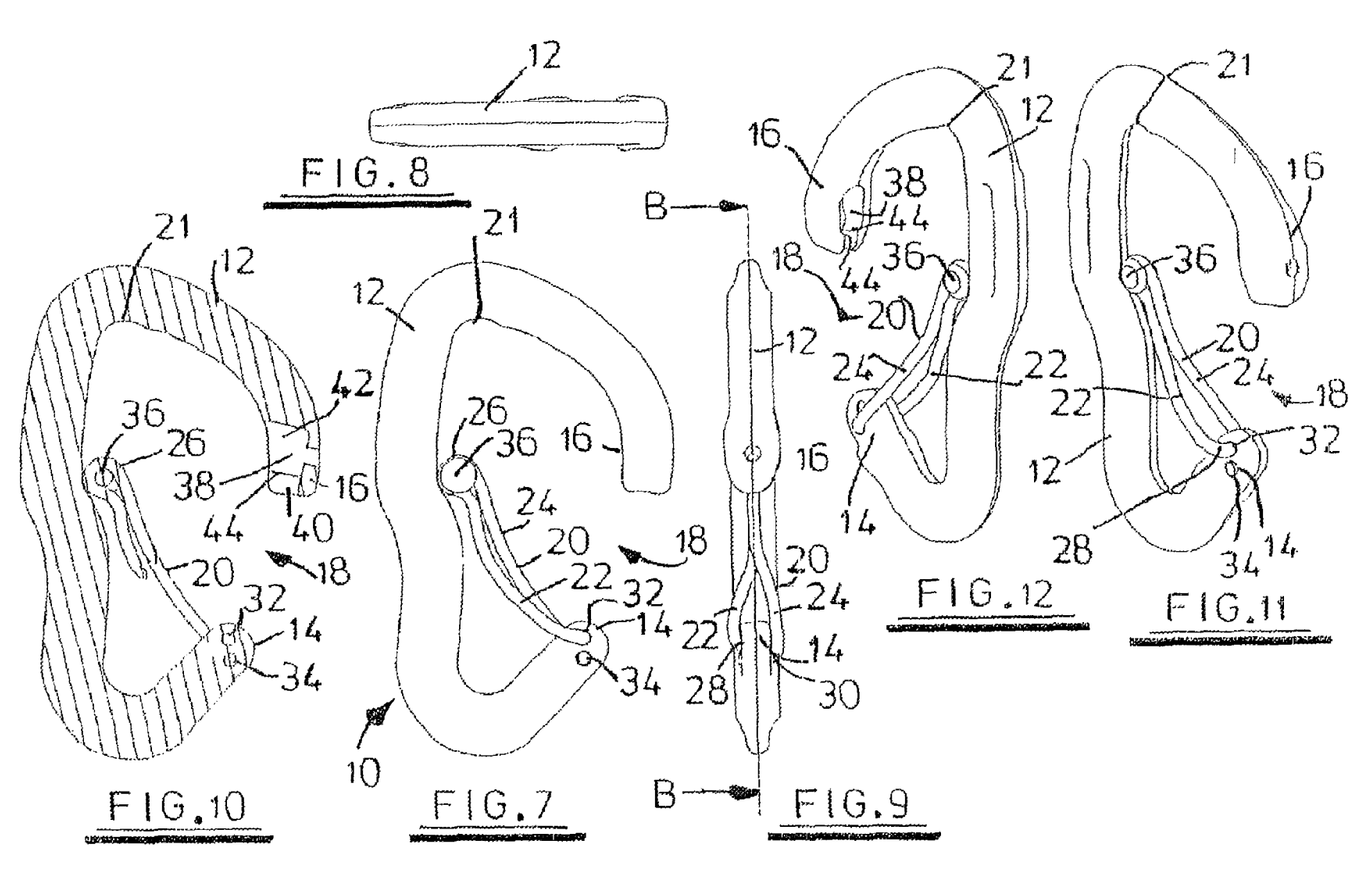
FIG. 7 is a side view of the karabiner of FIG. 1 in an open position.
FIG. 8 is a top plan view of the karabiner of FIG. 7.
FIG. 9 is a front view of the karabiner of FIG. 7.
FIG. 10 is a side sectional view on line B-B of the karabiner of FIG. 9.
FIG. 11 is a perspective view from one side in the front of the karabiner of FIG. 7.
FIG. 12 is a perspective view from the rear and opposite sides of the karabiner of FIG. 7.
Figures 13, 14, 15, 16, 17:
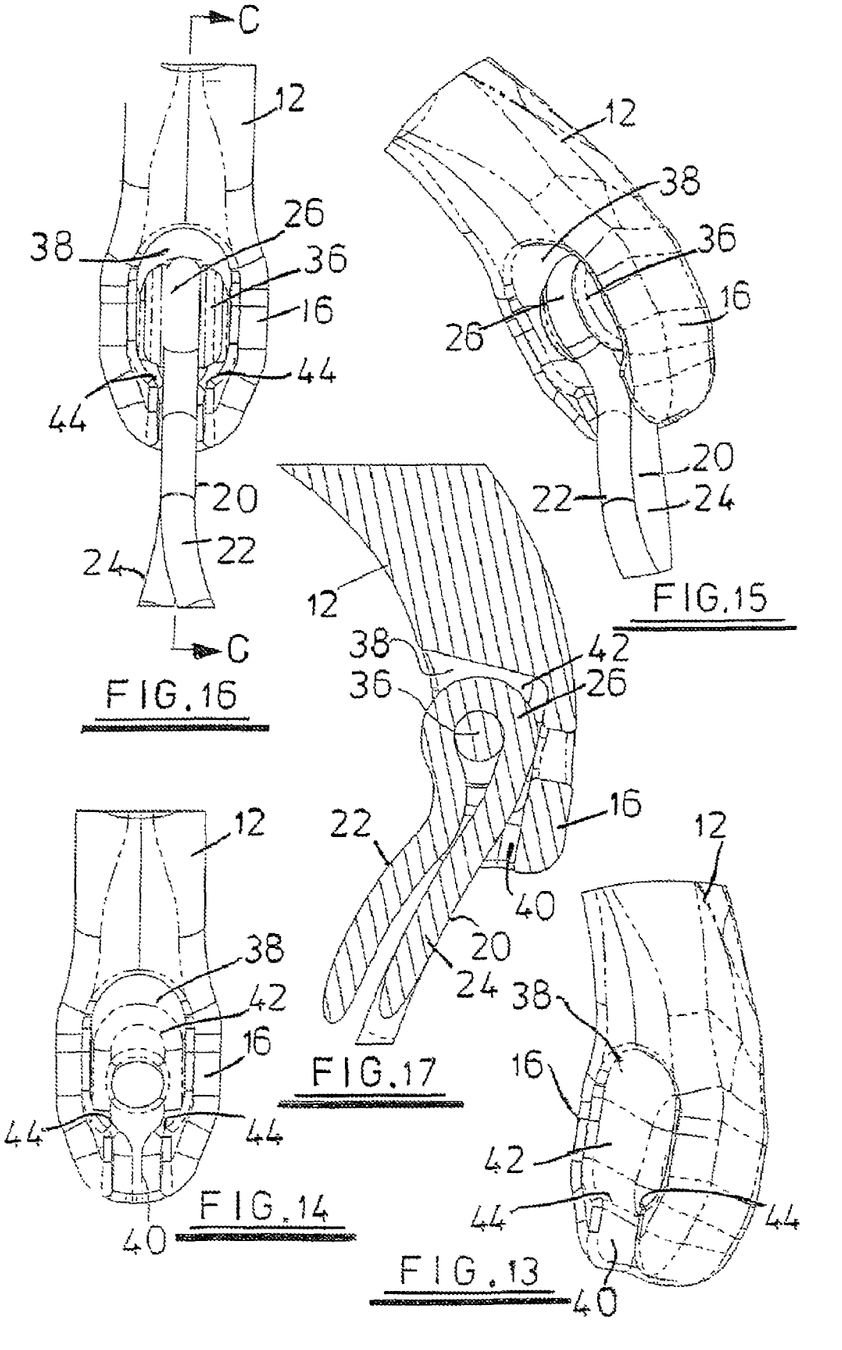
FIG. 13 is a perspective view of a gate receiving free end of the karabiner of FIG. 1.
FIG. 14 is a front view of the gate receiving free end of the karabiner of FIG. 1.
FIG. 15 is a perspective view of the gate receiving free end of the karabiner of FIG. 1 with the gate in a closed position.
FIG. 16 is a front view of the gate receiving free end of the karabiner of FIG. 1 with the gate in a closed position.
FIG. 17 is a side sectional view on line C-C of the karabiner of FIG. 16.
Figure 18:
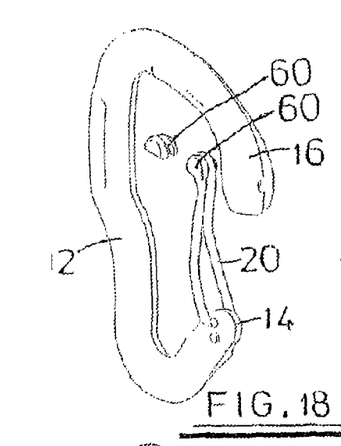
FIG. 18 is a perspective view from one side and the front of a further embodiment of the karabiner according to the present invention.
Figure 19:
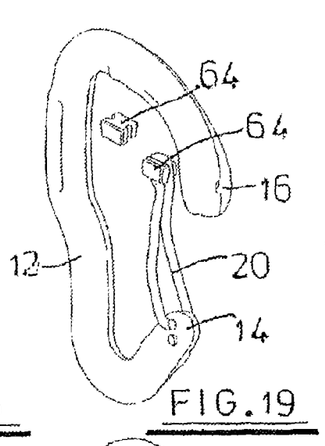
FIG. 19 is a perspective view from one side and the front of a further embodiment of the karabiner according to the present invention.
Figures 20, 21:
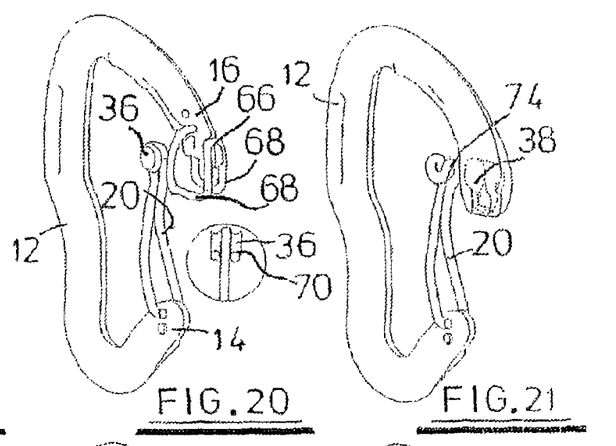
FIG. 20 is a perspective view from one side and the front of a further embodiment of the karabiner according to the present invention.
FIG. 21 is a perspective view from one side and the front of a further embodiment of the karabiner according to the present invention.

In FIG. 18, instead of a generally circular nut, nut 60 at the end of the gate 20 is generally semi-circular in side view. In FIG. 19, the karabiner 10 has a rectangular nut 64 at the end of the gate 20. FIG. 20 shows a karabiner 10 with a different means of forming the slot 38 for receiving the free end of the gate 20. The slot 38 is provided by a wire cage 66 fixed to the free end of the body 12. The cage 66 is formed of a wire bent to form two opposed U-shaped sides 68. The sides 68 converge outwardly of the karabiner 10, so that nut 36 can snap into the cage 66, but not pass through it. The nut 36 can have annular grooves 70 on either side of the gate 20 to locate on the wire of the cage 66. In FIG. 21, the end 74 of the gate 20 is folded over sideways instead of using a nut 36 and slot 38 in the free end of the body 12 and shaped to correspond to the shape of the end of the gate 20.

Figure 22:
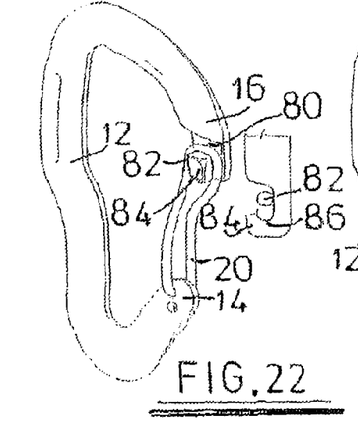
FIG. 22 is a perspective view from one side and the front of a further embodiment of the karabiner according to the present invention.
Figure 23:
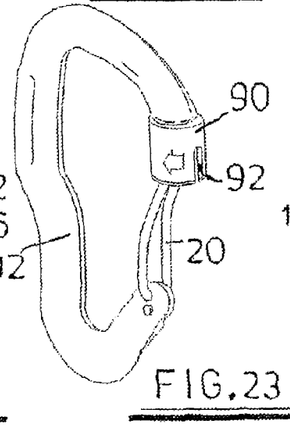
FIG. 23 is a perspective view from one side and the front of a further embodiment of the karabiner according to the present invention.

FIG. 22 shows a karabiner 10 with a slot 80 for the gate 20 accessible from the side of the free end of the body 12. The gate 20 has a slightly larger loop 82 at its free end that fits over peg 84 and into groove 86 in the top surface of the spigot. To open the gate 20, it has to be pulled sideways initially. FIG. 23 illustrates a karabiner 10 with a safety lock in the form of rotatable thimble 90 on the free end of the body 12. The thimble 90 has a slot 92 therein that, when aligned inwardly with the gate 20, allows the gate 20 to be opened and closed but when rotated out of that alignment locks the gate 20 closed.

Figures 24, 25:
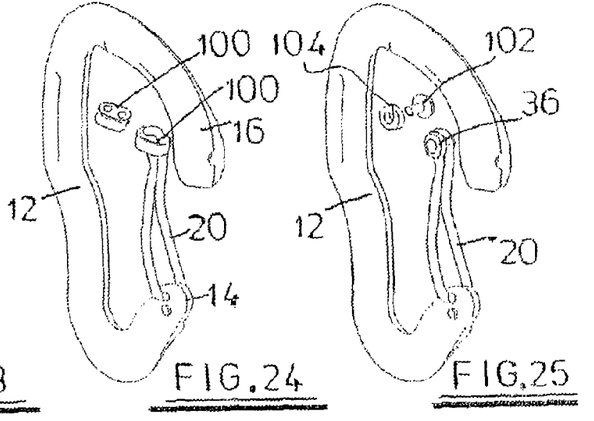
FIG. 24 is a perspective view from one side and the front of a further embodiment of the karabiner according to the present invention.
FIG. 25 is a perspective view from one side and the front of a further embodiment of the karabiner according to the present invention.
Figures 26, 27, 29, 30:
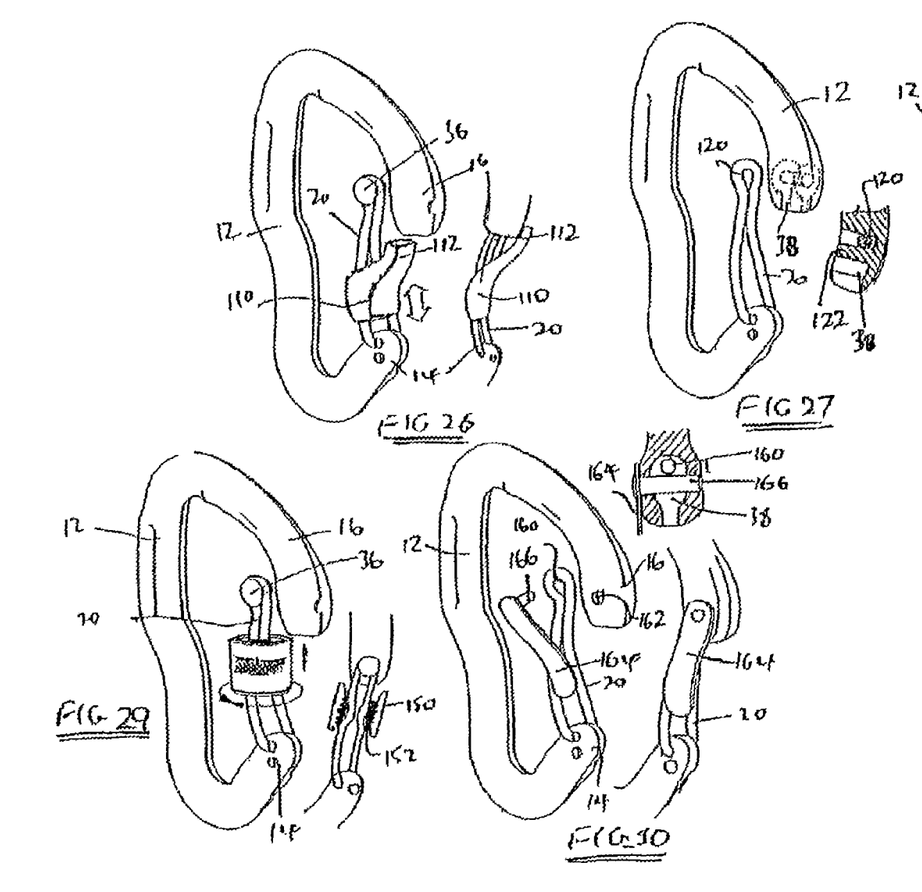
FIG. 26 is a perspective view from one side and the front of a further embodiment of the karabiner according to the present invention.
FIG. 27 is a perspective view from one side and the front of a further embodiment of the karabiner according to the present invention.
FIG. 29 is a perspective view from one side and the front of a further embodiment of the karabiner according to the present invention.
FIG. 30 is a perspective view from one side and the front of a further embodiment of the karabiner according to the present invention.

In FIG. 24, the gate 20 of the karabiner 10 has a nut 100 that is slid onto the gate 20. FIG. 25 illustrates how the nut 36 used in the karabiner 10 of FIG. 1 may be formed in two parts, one male 102 and the other female 104. Turning to FIG. 26, a karabiner of the type of FIG. 1 has a sliding locking member 110 on the gate 20, so that when the gate 20 is closed, the locking member 110 can be slid up towards the free end 16 of the body 12. The locking member 110 has a finger 112 that then overlies the body 12 on the opposite side to the slot 38, so that the gate 20 cannot be opened inadvertently.

Figure 28:
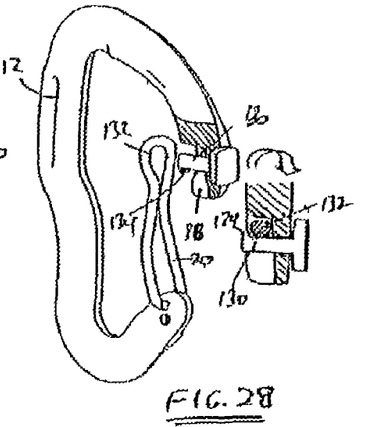
FIG. 28 is a perspective view from one side and the front of a further embodiment of the karabiner according to the present invention.
Figure 31:
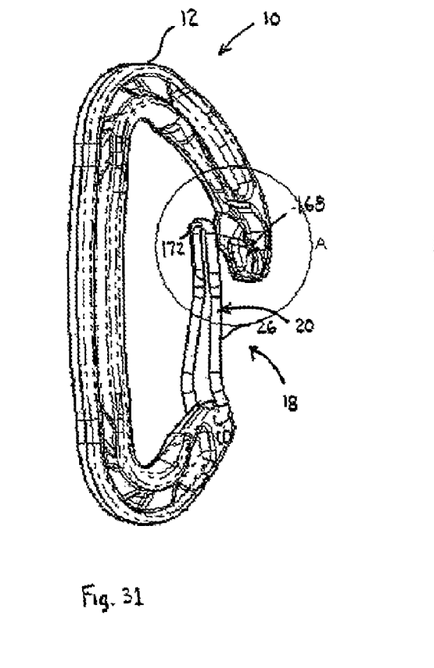
FIG. 31 is a perspective view from the rear and one side of a still further embodiment of a karabiner according to the present invention in an open position.

FIG. 27 shows how the slot 38 may be shaped to correspond to the shape of the gate end. In this case, the gate end is in the form of a transverse loop 120 and the slot has a peg 122 therein, over which the loop 120 locates. In FIG. 28, the slot 38 at the free end of the body 12 of the karabiner 10 has a rotatable locking pin 130 through the end of the body 12. The gate 20 has a loop 132 at its free end that locates over the pin 130. The pin 130 has a lip 134, so that with the lip downwards, as illustrated, the loop 132 can locate on the pin 130, but when the pin 130 is rotated through 180°, the lip 134 prevents the loop 132 from being freed.

FIG. 29 shows a locking thimble 150 provided on the gate 20. There is an outwardly screw-threaded sleeve 152 on the gate 20 and the thimble 150 is correspondingly threaded, so as to move upwards or downwards when rotated. When the thimble 150 is moved upwards, it partly overlies the free end of the body 12, so that the gate 20 cannot be opened. Finally, FIG. 30 shows a karabiner 10 having a gate 20 with a loop 160 at its free end 16 and there is a hole 162 through the free end 16 of the body 12 in the region of the gate receiving slot 38, so that when the gate 20 is closed, the loop 160 and hole 162 coincide. A strap 164 attached to the gate has a pin 166 to lock the gate 20 closed.

A still further and preferred non-limiting embodiment of the present invention is illustrated in FIGS. 31-36. Like parts have been given the same reference numbers throughout for ease in understanding.

In particular, the karabiner 10 of this embodiment includes the generally C-shaped body 12 having a first free end 14 and a second free end 16, which results in a gap 18 therebetween. A gate 20 effectively closes the gap 18 upon constraint. As discussed hereinabove, the gate 20 is formed of a wire member or wire strands 22, 24 located on the first free end 14 of the body 12. The gate 20 is in the form of a loop 26 that includes a shaped free end. The second free end 16 of the C-shaped body 12 includes a recessed seat 168 for receiving the shaped free end of the gate 20. Further, this recessed seat 168 is shaped to correspond substantially with the shaped end of the gate 20. In one preferred embodiment, the recessed seat 168 is in a substantially horseshoe shape.

As seen in the figures, the karabiner 10 of this embodiment, and in particular the recessed seat 168, is bounded by one or more walls 170. In operation, when the gate 20 is in a closed position, and the shaped free end of the loop 26 is contacting the recessed seat 168, the wall or walls 170 protect an end portion 172 of the shaped free end of the loop 26 from contact. For example, the wall or walls 170 protect the end portion 172 of the loop 26 from contact or snagging with the rope, a line or similar object. In addition, the wall or walls 170 protect the end portion 172 of the loop 26 from impact, such as sideward impact or outside or outward object impact, such as a boot, a rock, etc. Therefore, the structure of this embodiment serves to prevent the accidental opening of the gate 20 by protecting the end portion 172 of the loop 26 from contact.

In a further embodiment, the second free end 16 of the body 12, which includes the recessed seat 168, also includes an outer wall 174 that at least partially bounds an outer side of the end portion 172 of the loop 26 when the gate 20 is in the closed position and the shaped free end of the loop 26 is contacting the recessed seat 168. In addition, an inner wall 176 is provided and at least partially bounds an inner side of the end portion 172 of the loop 26 when the gate is in a closed position and the shaped end of the loop 26 is contacting the recessed seat 168. In this manner, the walls 170 (such as the outer wall 174 and the inner wall 176) at least partially shroud the end portion 172 of the loop 26 when the gate is in the closed position.

Figure 32:
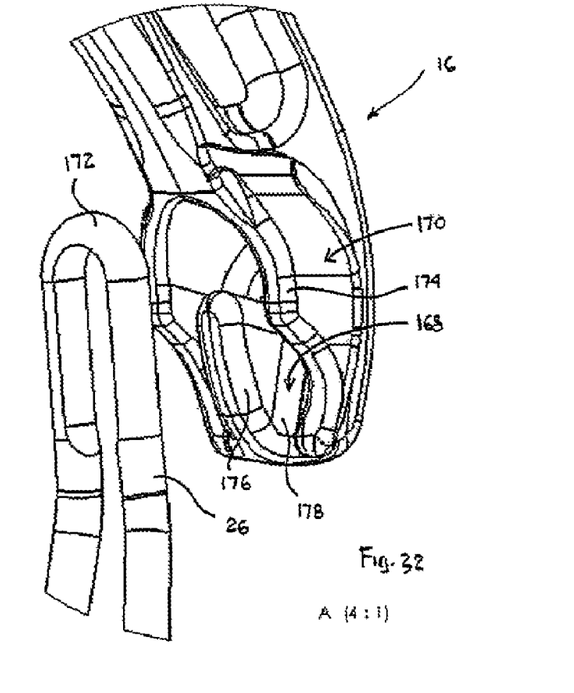
FIG. 32 is a magnified perspective view of circle A of the karabiner of FIG. 31.
Figure 33:
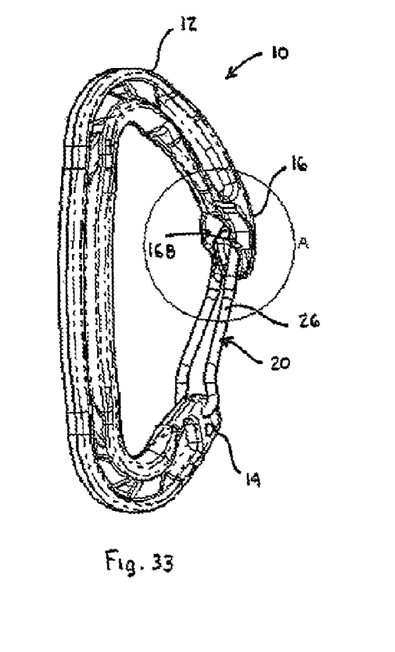
FIG. 33 is a perspective view from the rear and side of the karabiner of FIG. 31 in a closed position.
Figure 34:
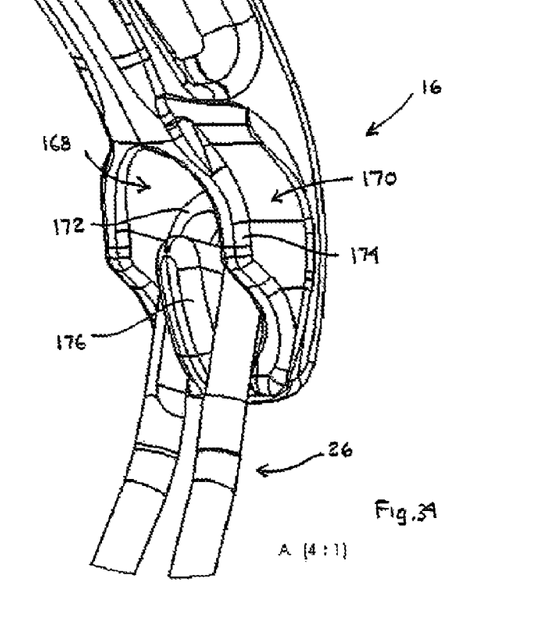
FIG. 34 is a magnified perspective view of circle A of the karabiner of FIG. 33.
Figure 35:
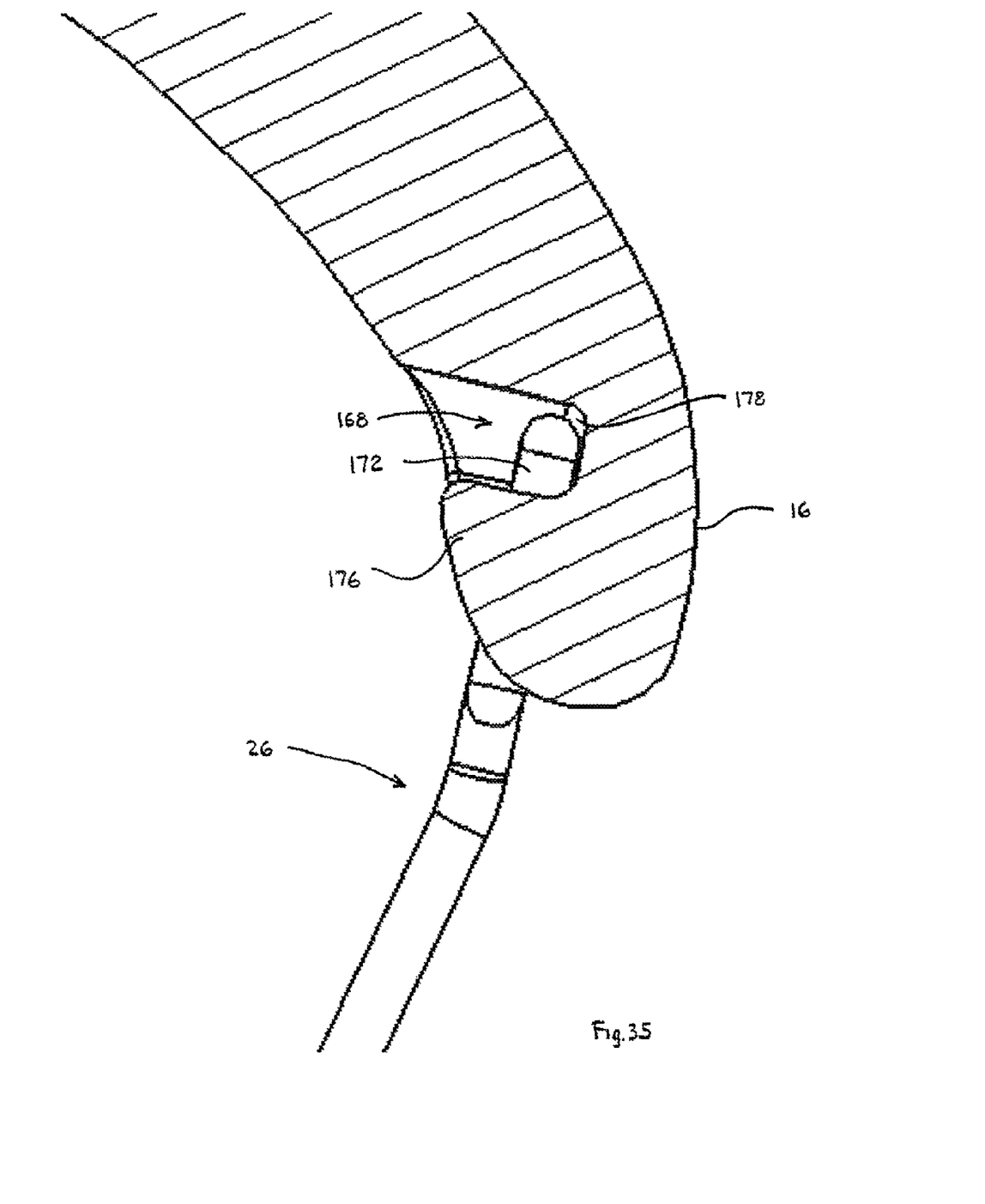
FIG. 35 is a side sectional view of the karabiner of FIG. 34.
Figure 36:
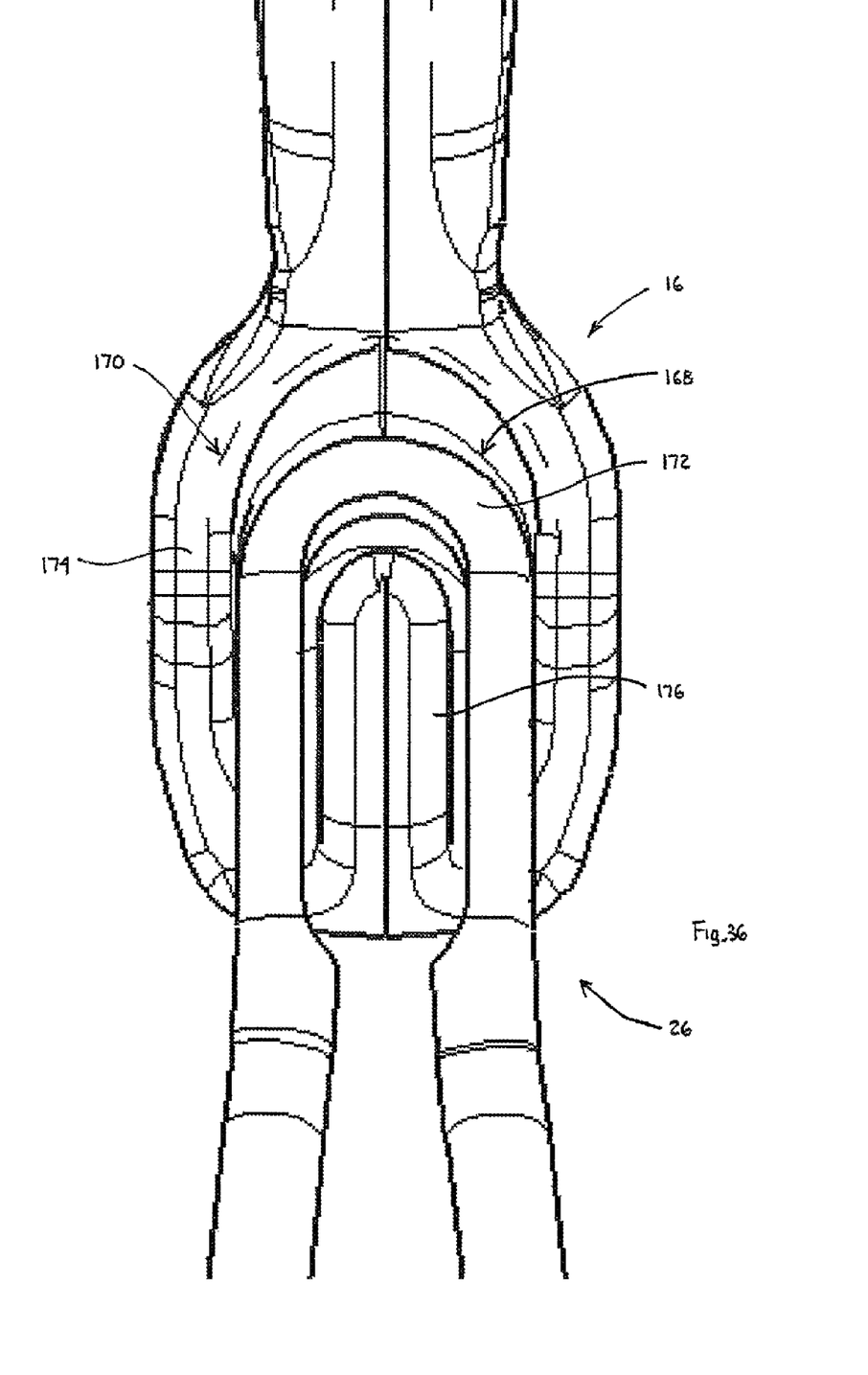
FIG. 36 is a rear perspective view of the karabiner of FIG. 34.

As best seen in FIGS. 32, 34 and 36, the inner wall 176 is positioned substantially adjacent the recessed seat 168 and is configured to receive the shaped end of the loop 26 thereover. In addition, in a further embodiment, the recessed seat 168 includes a shaped groove 178 at a base portion of the recessed seat 168. The shape of the shaped groove 178 corresponds substantially to the shape of the end portion 172 of the loop 26. In particular, the shaped groove 178 allows the end portion 172 of the loop 26 to better engage and contact the recessed seat 168.

As discussed above in connection with the previous embodiments of the karabiner 10 of the present invention, the present embodiment may also be fitted with or manufactured with the various locking means discussed above. These locking means operate in substantially the same manner as discussed above in connection with karabiner 10 of this embodiment.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A karabiner comprising:
   a generally C-shaped body, with its free ends curved towards each other and forming a gap therebetween; and
   a gate for closing the gap such that the gate is constrained to close the gap;
   wherein the gate is formed of a wire member located on one free end of the body, the gate being in the form of a loop oriented substantially transversely to the plane of the karabiner body,
   wherein the other free end of the body has a slot for receiving a shaped end of the gate, which slot is shaped to correspond substantially with the shape of the shaped end of the gate, wherein the slot includes a peg therein over which the loop locates.

2. The karabiner of claim 1, wherein the peg has a surface adapted to engage the gate end, the surface being in a plane substantially normal to a longitudinal axis of the gate.

3. The karabiner of claim 2, wherein the free ends of the body are adapted to be drawn inwards and to cause the surface to slope upwards in the direction of the opening of the gate when loads are applied to opposite ends of the karabiner body.

4. The karabiner of claim 1, wherein the gate is formed by a wire that is bent and has each free end further bent inwards towards the other to locate in a different hole on opposite sides of the free end of the body, one hole spaced above the other.

5. The karabiner of claim 1, wherein the gate is shaped by one of folding and bending the wire to form a shaped end at a free end.

6. The karabiner of claim 5, wherein the end of the gate is bent over sideways.

7. The karabiner of claim 1, wherein the loop at the end of the gate is enlarged.

8. The karabiner of claim 1, wherein, from the free end of the body, the slot includes a first narrow part to accommodate the wire gate and leading to a wider second part to accommodate the shaped end of the gate.

9. The karabiner of claim 8, where a ledge is provided between the wide and narrow parts of the slot.

10. The karabiner of claim 9, where the ledge is in a plane substantially normal to a longitudinal axis of the gate.

11. The karabiner of claim 1, wherein the slot of the free end of the body faces inwards towards the body of the karabiner.

12. The karabiner of claim 1, wherein the slot is on the side of the free end of the body.

13. A karabiner comprising:
   a generally C-shaped body having opposed free ends with a gap therebetween; and
   a gate for closing the gap such that the gate is constrained to close the gap,
   wherein the gate is formed of a wire member located on one free end of the body, the gate being in the form of a loop having a shaped free end, and
   wherein the other free end of the body has a recessed seat for receiving the shaped free end of the gate, which seat is shaped to correspond substantially with the shaped end of the gate, wherein the seat includes a peg therein over which the loop locates.

14. The karabiner of claim 13, wherein the recessed seat is in a substantially horseshoe shape.

15. The karabiner of claim 13, wherein the recessed seat is at least partially bounded by at least one wall, such that when the gate is in a closed position and the shaped free end of the loop is contacting the recessed seat, the at least one wall protects at least an end portion of the shaped free end of the loop from contact.

16. The karabiner of claim 15, where in the contact of the at least one wall protects the end portion of the shaped free end of the loop from rope contact, line contact, impact, substantially sideward impact, outward object impact or any combination thereof.

17. The karabiner of claim 13, wherein the free end of the body having the recessed seat further comprises:
   an outer wall configured to at least partially bound an outer side of an end portion of the loop when the gate is in a closed position and the shaped free end of the loop is contacting the recessed seat; and
   an inner wall configured to at least partially bound an inner side of the end portion of the loop when the gate is in a closed position and the shaped free end of the loop is contacting the recessed seat.

18. The karabiner of claim 13, wherein the free end of the body having the recessed seat includes at least one outer wall positioned substantially adjacent the recessed seat and configured to at least partially shroud an end portion of the loop when the gate is in a closed position and the shaped free end of the loop is contacting the recessed seat.

19. The karabiner of claim 13, where the free end of the body having the recessed seat includes at least one inner wall positioned substantially adjacent the recessed seat and configured to receive the shaped free end of the loop thereover, such that when the gate is in a closed position and the shaped free end of the loop is contacting the recessed seat, the shaped free end of the loop at least partially surrounds the inner wall.

20. The karabiner of claim 13, wherein the recessed seat includes a shaped groove at a base portion thereof, the shaped groove shaped to correspond substantially to an end portion of the shaped free end of the loop.

21. The karabiner of claim 13, where in the free end of the body having the recessed seat comprises at least one outer wall, such that when the gate is in a closed position and the shaped free end of the loop is contacting the recessed seat, the at least one wall protects at least an end portion of the shaped free end of the loop from contact.

22. The karabiner of claim 21, wherein the contact of the at least one outer wall protects the end portion of the shaped free end of the loop from rope contact, line contact, impact, substantially sideward impact, outward object impact or any combination thereof.

23. The karabiner of claim 13, wherein the free end of the body having the recessed seat includes at least one wall at least partially surrounding the recessed seat, such that the recessed seat is at least partially bounded and in a substantially horseshoe shape.

* * * * *